March 27, 1951     J. F. ALCOCK     2,546,415
CIRCUMFERENTIALLY ARRANGED TEMPERATURE DEVICE
IN JET PIPE OF COMBUSTION TURBINE
Filed Dec. 2, 1946
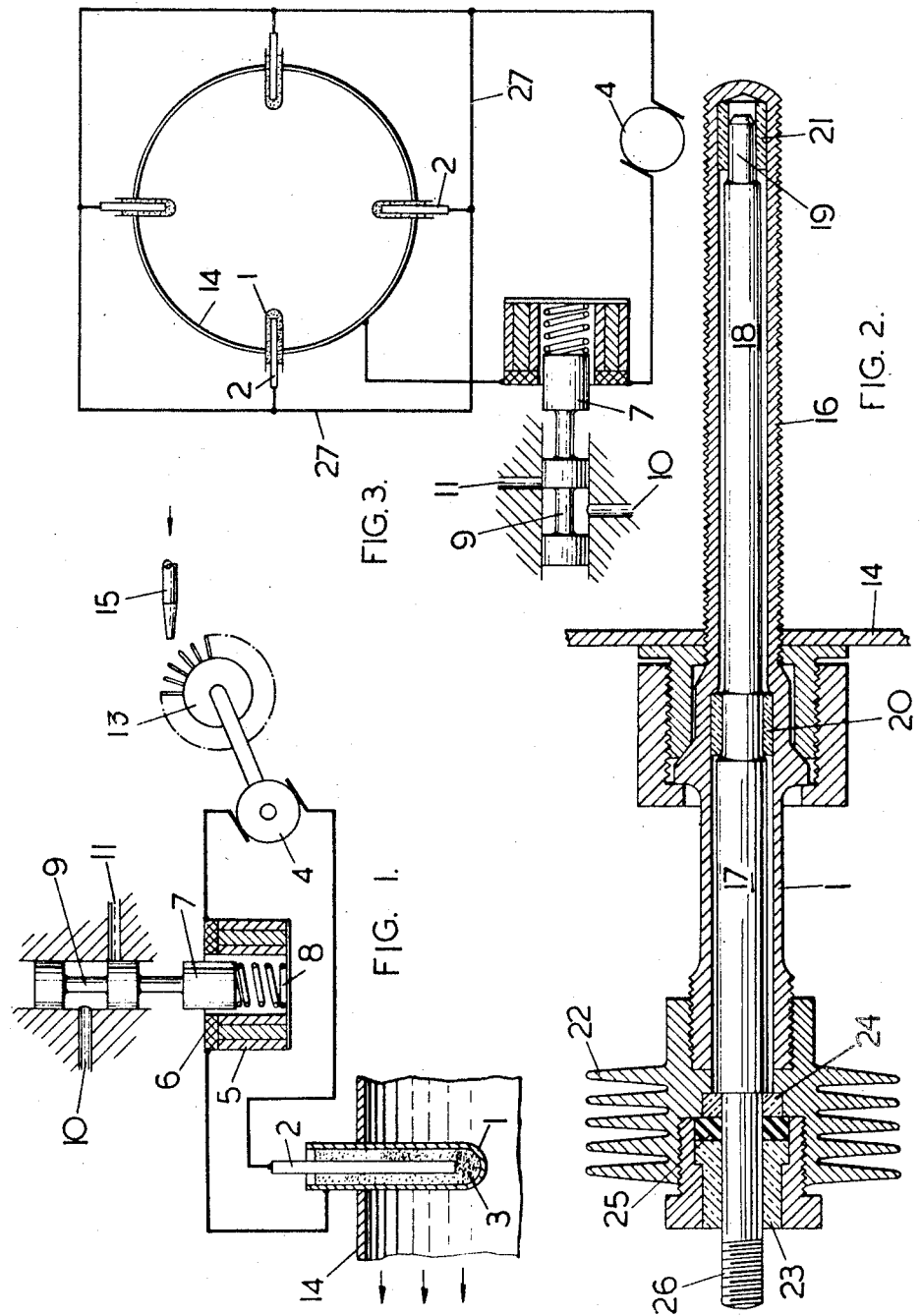

UNITED STATES PATENT OFFICE 2,546,415

CIRCUMFERENTIALLY ARRANGED TEMPERATURE DEVICE IN JET PIPE OF COMBUSTION TURBINE

John Forster Alcock, North Lancing, England, assignor to Power Jets (Research and Development) Limited, London, England, a British company Application December 2, 1946, Serial No. 713,431
In Great Britain December 3, 1945

1 Claim. (Cl. 60—41)

This invention relates to an improved type of temperature control system for a gas turbine engine.

It is known to use as a temperature regulating device an apparatus comprising a metal tube containing a single electrode held in spaced relation therein, the tube containing a substance which is a relatively poor conductor at low temperature and a relatively good conductor at higher temperatures in the region of that to be controlled so that at the latter temperature an electric current can be passed through the apparatus to operate the regulating means.

The present invention makes use of an electrical temperature control unit comprising a metal sheath, a metal core arranged within said sheath and held electrically insulated and spaced from the inner wall of said sheath so as to provide a space between said member and said wall having very small depth relatively to its longitudinal and lateral dimensions, and a fusible substance contained within said space, said substance being fusible at a temperature in the region of that to be controlled or indicated, and being a relatively poor conductor at normal atmospheric temperature while becoming a relatively good conductor at a temperature approaching its fusion temperature, the material of the casing being non-corrodible by the fusible substance.

Preferably the casing is substantially cylindrical and the electrode is a cylinder co-axial with said casing.

Appropriate means are provided to secure the metal core firmly and accurately spaced within this sheath.

One particular application of the invention envisaged is to the control of temperature of the hot exhaust gases of a gas turbine engine of the kind wherein air delivered by a compressor is brought to combustion together with fuel injected through suitable burners into the compressor delivery, the hot gases of combustion driving a turbine which in turn drives the compressor, and the excess energy being developed either as turbine shaft power or in the form of a propulsive jet or both.

In the case of a gas turbine engine it is desirable to ensure that the temperature of the hot gases in the exhaust duct does not exceed a given value which at present is of the order of 600-700° C. Accordingly a plurality of electrical temperature control units of the type described above are arranged in circumferential series within the jet pipe of a gas turbine engine. The electrical temperature control units will contain a fusible substance which is generally a salt or mixture of salts and is suitably chosen to become conducting at or near the maximum temperature desired. Alternating current passing through the salt when conducting is used to excite a magnet to attract an armature which is linked to a valve for reducing or cutting off the fuel supplied to the burners. The fusible substance used may be, for example, lithium chloride, or a mixture of calcium chloride and potassium chloride in the proportions of for example approximately 81% and 19% respectively (melting point about 640° C.) of a mixture of calcium chloride and sodium chloride in the proportions for example of approximately 70% and 30% respectively (melting point about 653° C.) or a mixture of sodium chloride and sodium fluoride in the proportions of for example approximately 73% and 27% respectively (melting point about 675° C.), and the above-mentioned substances should preferably be pure and in particular free from sulphate and nitrate impurities to avoid corrosion of the casing particularly when this is metallic.

It has been found that a nickel-chromium alloy of approximately 80% nickel and 13% chromium with the remainder iron, or a copper nickel alloy of approximately 60% copper and 40% nickel are suitable alloys for use with the above-mentioned salts. These salts undergo considerable reduction in resistance and become relatively highly conducting at a temperature of the order of 15-30° C. below their fusion points, while they are electrical insulators or relatively poor conductors at normal atmospheric temperatures.

Examples of the invention are hereunder described with reference to the accompanying drawing in which:

Fig. 1 is a diagrammatic illustration of one form of control system;

Fig. 2 is a sectional view of a detail in said form;

Fig. 3 is a modification of the system of Fig. 1;

In Fig. 1 which illustrates an application to a gas turbine exhaust duct, an elongated casing 1 of electrically conducting material and of approximately cylindrical shape extends through the wall 14 of the exhaust duct and is provided with a centrally disposed internal electrode 2 spaced from the wall of casing 1, the space between the electrode and the wall being filled with a suitable fusible salt or mixture of salts 3. An alternating current delivered by an A. C. generator 4 is led to the electrode 2 and when the salt 3 is conducting current passes through it to the casing 1 from which it is led to a solenoid 5 adapted to excite a magnet 6.

The latter when so excited attracts a plunger 7 against the resistance of a spring 8, the plunger 7 having a recessed part 9 co-operating with parts 10, 11, which communicate with conduits for the passage of fuel. The arrangements may be such that when magnet 6 is excited, plunger 7 moves downwards to put parts 10 and 11 into communication with one another and so open a bypass to restrict the amount of fuel supplied to the burners.

Alternatively, in the case of burners in which part of the fuel supplied to the burners is returned by a spill pipe to supply while the remainder is ejected through the burner nozzle for combustion, the plunger 7 on its downward movement may open communication with the spill pipe thus increasing the flow in the latter and decreasing the supply of fuel to the burners.

The generator 4 which need be of only small power may be driven by a small air turbine 13 fed from the compressor delivery through a duct 15 or by an auxiliary drive.

Fig. 2 illustrates one form of construction of the casing 1 and electrode 2. The casing 1 is a tube having a threaded part 16 of smaller internal bore for screwing through the exhaust duct wall 14, and the electrode 1 consists of a metal rod 17 having turned down parts 18, 19, and held in position within casing 1 by silica tubes 20, 21 which fit tightly over their respective rod portions and also fit tightly within their respective tube portions. A hexagon nut 22 screws over that end of casing 1 remote from tube 21 and holds in place insulating washers 24, 25, insulating bush 23 and a metal rod 26 abutting at one end against rod 17 and threaded at its opposite end to serve as an electrode terminal.

As shown in Fig. 3 preferably a number of units 1, 2, 3 are used in parallel arranged symmetrically around duct 14, all the casings 1 being electrically connected to pipe 14 which forms a common return and all the electrodes 2 being interconnected by conductors 27 so as to obtain an effect related to the maximum local value of the temperature of the hot gases inside the duct. An effect related to the minimum local temperature may be obtained by connecting all units in series, and to the mean temperature by inserting suitable resistances in series with the electrode circuit when the units are used in parallel.

Where the provision of solid insulators in the heated zone is inconvenient, owing for example to chemical attack of the insulating material by the fusible substance, the latter may consist of a mixture of a component fusible at the desired control temperature and a component infusible at that temperature, the latter remaining solid at the operating temperature and thus maintaining the electrode in suitable spatial relationship to the casing. For example, a non-eutectic salt mixture may be used, the liquidus acting as the conducting medium and the solidus as the insulator.

The invention also has application to a gas turbine engine in the case when a heat exchanger is used for example between the compressor and the turbine whereby the compressed air receives heat from part of the hot gases. In this case it may be important to control the temperature of the gases immediately downstream or upstream of the turbine, or at any other part of the heat exchanger system.

Temperature control apparatus of the type above described has the advantages of extreme simplicity, sturdiness, large operating power and high sensitivity over a small temperature range, and enables external piping to be replaced by less vulnerable electric wiring.

I claim:

An electrical temperature control system for a gas turbine engine comprising a plurality of units each comprising a metal sheath, a metal core arranged within said sheath and held electrically insulated and spaced from the inner wall of said sheath so as to provide a space between said member and said wall having very small depth relatively to its longitudinal and lateral dimensions, and a fusible substance contained within said space, said substance being fusible at a temperature in the region of that to be controlled, and being a relatively poor conductor at normal atmospheric temperature while becoming a relatively good conductor at a temperature approaching its fusion temperature, the material of the casing being non-corrodible by the fusible substance, said units being arranged in a circumferential series within the jet pipe of said engine.

JOHN FORSTER ALCOCK.

REFERENCES CITED

The following references are of record in the file of this patent:

UNITED STATES PATENTS

| Number | Name | Date |
|---|---|---|
| 441,488 | Hensley et al. | Nov. 25, 1890 |
| 1,592,376 | MacFarland | July 13, 1926 |
| 2,353,929 | Ray | July 18, 1944 |
| 2,413,125 | Walbridge | Dec. 24, 1946 |
| 2,463,566 | Saldin | Mar. 8, 1949 |

FOREIGN PATENTS

| Number | Country | Date |
|---|---|---|
| 537,155 | Great Britain | June 11, 1941 |